UNITED STATES PATENT OFFICE.

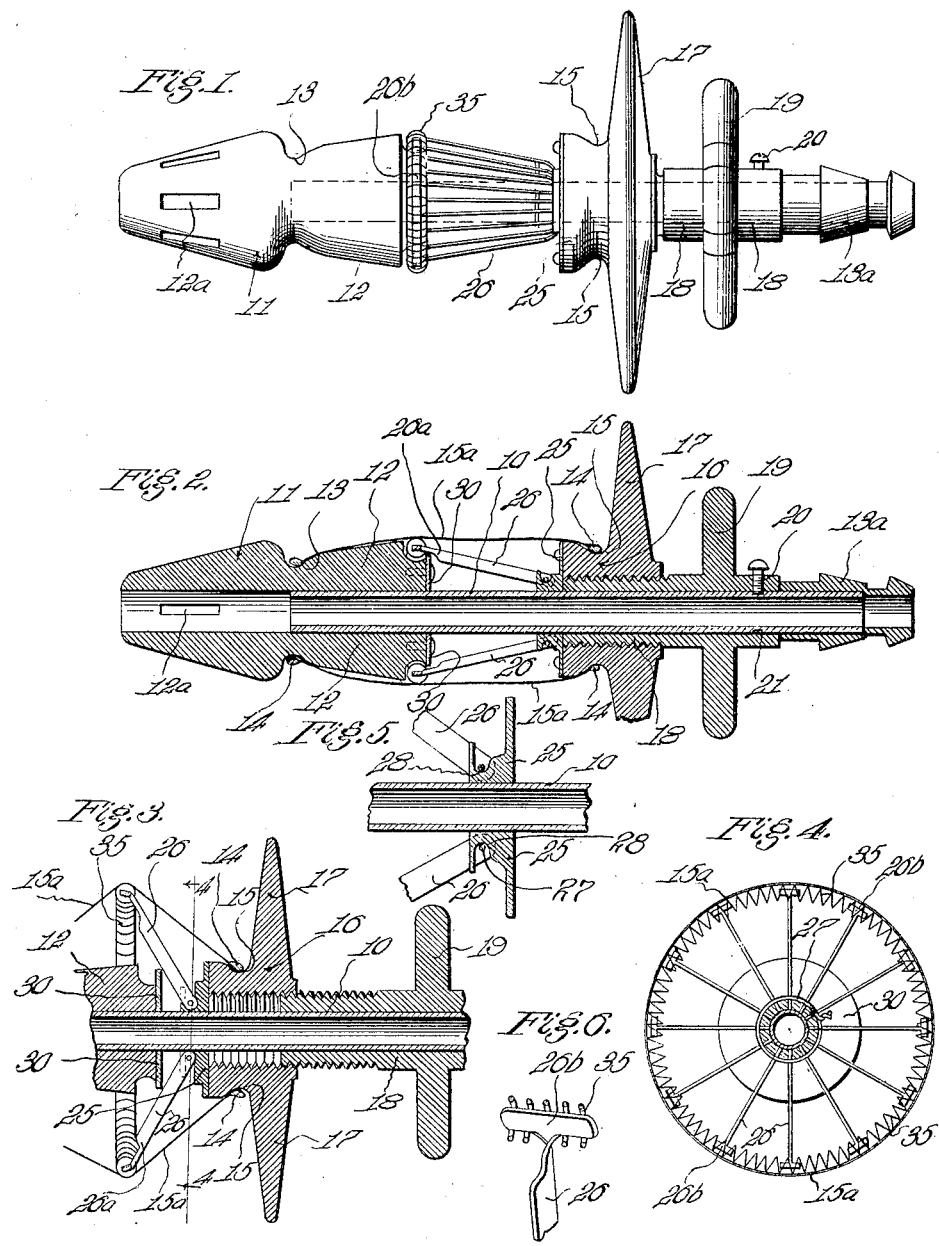

SAMUEL L. KISTLER, OF LOS ANGELES, CALIFORNIA.

NOZZLE FOR VAGINAL SYRINGES.

1,089,061.  Specification of Letters Patent.  Patented Mar. 3, 1914.

Application filed February 23, 1912. Serial No. 679,262.

*To all whom it may concern:*

Be it known that I, SAMUEL L. KISTLER, a citizen of the United States, residing at Los Angeles, in the county of Los Angeles, State of California, have invented new and useful Improvements in Nozzles for Vaginal Syringes, of which the following is a specification.

This invention relates to improvements in my nozzle for vaginal syringes set forth in my Patent No. 868,450 issued to me on October 15th, 1907; and the improvements consist primarily in the substitution of mechanical means in place of the pneumatic or fluid pressure appliance described in that patent for the purpose of inflating a rubber packing tube which forms a liquid-tight dam around the syringe nozzle.

The present invention embodies broadly the combination of an expansible liquid-tight ring or sleeve with a mechanical expanding means within the sleeve. Or it embodies broadly the combination of a sleeve or the like expansible or contractible by the longitudinal movement of parts of the syringe nozzle. By using such a mechanical means I am enabled to expand a rubber or other sleeve from a comparatively small diameter to one several times larger, accommodating the diameter to circumstances. In my older device the pneumatic or fluid inflation did not provide for sufficient expansibility and also had the disadvantage of being of such a nature as to be difficult of replacement by a user. My present invention overcomes all of these objections, providing a mechanism which is purely mechanical in its operation, will expand to a large diameter if necessary and in which the only part liable to wear and deterioration, the expansible rubber sleeve, is easily replaceable.

In the accompanying drawings: Figure 1 is an exterior view of my improved device, omitting the expansible rubber sleeve. Fig. 2 is a central longitudinal section of the same contracted and covered with the expansible rubber sleeve. Fig. 3 is a detailed view of portions shown in Fig. 2, with the parts in their expanded position. Fig. 4 is a section taken on line 4—4 of Fig. 3. Fig. 5 is a detail section showing a portion of the expanding construction. Fig. 6 is a perspective detail showing another portion of the expanding construction.

My device consists essentially of a central longitudinal tube 10 having on one end a nozzle portion 11, the tube and nozzle being adapted to deliver liquid through nozzle openings 12$^a$ of any desired character. The outer end of the tube may be provided with a fitting 13$^a$ for attachment to a rubber tube or other connection with a source of suitable fluid supply. The nozzle portion 11 and the tube 10 together constitute the body of my improved device. The nozzle portion 11 is extended rearwardly as at 12, having an annular depression 13 in which the beaded contracting end 14 of expansible rubber sleeve 15$^a$ is adapted to fit. The beaded end is a typical means of closely engaging the end of the sleeve with the nozzle; liquid-tight engagement may be effected in other manners. The other similarly beaded contracting end 14 of the rubber tube preferably fits in a similar groove 15 in longitudinally movable member 16. This member 16 is provided with a suitable circular guard 17 and is moved longitudinally on the tube 10 either directly by hand or through the medium of a mechanism such as a screw threaded sleeve 18 rotated by hand wheel 19. The sleeve 18 is prevented from longitudinal movement on tube 10 by means of a set screw 20 entering a suitable annular groove 21 in tube 10. By turning the hand wheel 19, which is in a convenient position and of convenient diameter, the member 16 may be advanced or retracted on the tube 10. The longitudinal movement of member 16 on the tube 10 causes the operation of the expanding means to increase the diameter of the rubber sleeve. Broadly speaking, this expanding means may be of any nature and coöperate with the sleeve in any manner; it may be distinct from or incorporated with the sleeve. But I have shown, and will describe, a preferred form of mechanism which acts to expand the sleeve interiorly by virtue of the relative longitudinal movement described.

On its forward end the member 16 carries a suitable plate 25 to which are pivotally attached the expanding arms 26. Expanding arms 26 are each provided with an aperture at one end, through which apertures the securing wire 27 passes, the wire resting in annular groove 28 in plate 25. The free ends of arms 26 extend normally as is best shown in Figs. 1 and 2 and rest in the position illustrated on a suitable plate 30 secured to the rear end of extension 12 of nozzle portion 11. The arms 26 are notched out as at 26$^a$ so as to move inwardly toward each other as far as possible and to correspondingly contract the diameter of the circle within which their outer ends will come. On the outer end of each arm 26 is a portion 26^b extending at right angles to the plane of the arm and which is of such size and shape as to effectively engage within a circular spiral spring 35. This spiral spring is preferably endless and continuous, and is of such size that it will contract to the diameter shown in Figs. 1 and 2, pulling the arms 26 inwardly with it, and that it may be expanded to such position as is shown in Figs. 3 and 4. The spiral spring 35 forms a continuous support for the rubber or other expansible tube 15^a, and causes the outer periphery of the tube when expanded to be substantially circular as is illustrated in Fig. 4. The spring also supports and forms a smoothly rounded edge portion at the outer periphery of the expanded sleeve and prevents injury by any sharp points.

It will be seen that with this simple mechanical construction I am enabled to expand the liquid-tight sleeve to any desired diameter. The end of the sleeve tightly engaging the nozzle portion 11 prevents any liquid from passing between the sleeve and the body of the syringe nozzle; and the sleeve may be expanded in its center to any desired diameter so as to make a liquid-tight joint around its outer edge. Any mechanical means may be employed to expand the sleeve; or any means which will expand the sleeve by virtue of relative longitudinal movement of the parts of the nozzle.

Having described my invention, I claim:

1. A syringe nozzle, comprising a nozzle portion having a longitudinal passage, a tube forming a continuation of said passage and extending from the nozzle portion, a member longitudinally movable on the tube, a series of expanding arms pivoted to said member and bearing against the nozzle portion, an annulus of coiled spring wire mounted upon the ends of the arms, and an expansible liquid-tight covering for the expanding arms, said covering directly resting upon and supported by said annulus.

2. A syringe nozzle, comprising a nozzle portion having a longitudinal passage, a tube forming a continuation of said passage and extending from the nozzle portion, a member longitudinally movable on the tube, a series of expanding arms pivoted to said member at one end and bearing against the nozzle portion near their free ends, a resilient expansible ring of coiled wire spring surrounding the free ends of the expanding arms, and an expansible liquid-tight sleeve surrounding the expanding arms and secured at one end to the nozzle portion and at the other to the longitudinally moving member and resting directly upon and supported by said ring of coiled wire.

3. A syringe nozzle, comprising an apertured body, a thin sleeve of expansible material over the body and tightly attached thereto at one end, and an expansion means within the sleeve including an annulus of coiled wire spring directly engaging the interior of the sleeve, and means for expanding said annulus of coiled wire.

4. A syringe nozzle, comprising an apertured body, a thin sleeve of expansible material over the body and tightly attached thereto at one end, and an expansion means within the sleeve including an annulus of coiled wire spring directly engaging the interior of the sleeve, and means for expanding said annulus of coiled wire including a series of pivoted arms adapted to be swung outwardly away from the nozzle body and from each other.

5. In a device of the character described, an expansible liquid-tight construction comprising a body member, a member slidable thereon, a liquid-tight sleeve of thin resilient material having its ends tightly secured to the body and slidable member respectively, an annulus of coiled wire spring in direct contact with the inner surface of the sleeve, and means coöperated with the slidable member for causing expansion of said annulus.

In witness that I claim the foregoing I have hereunto subscribed my name this 16th day of February 1912.

S. L. KISTLER.

Witnesses:
BESSIE McMORDIE,
JAMES T. BARKELEW.

---

Copies of this patent may be obtained for five cents each, by addressing the "Commissioner of Patents. Washington, D. C."